Figure 1:
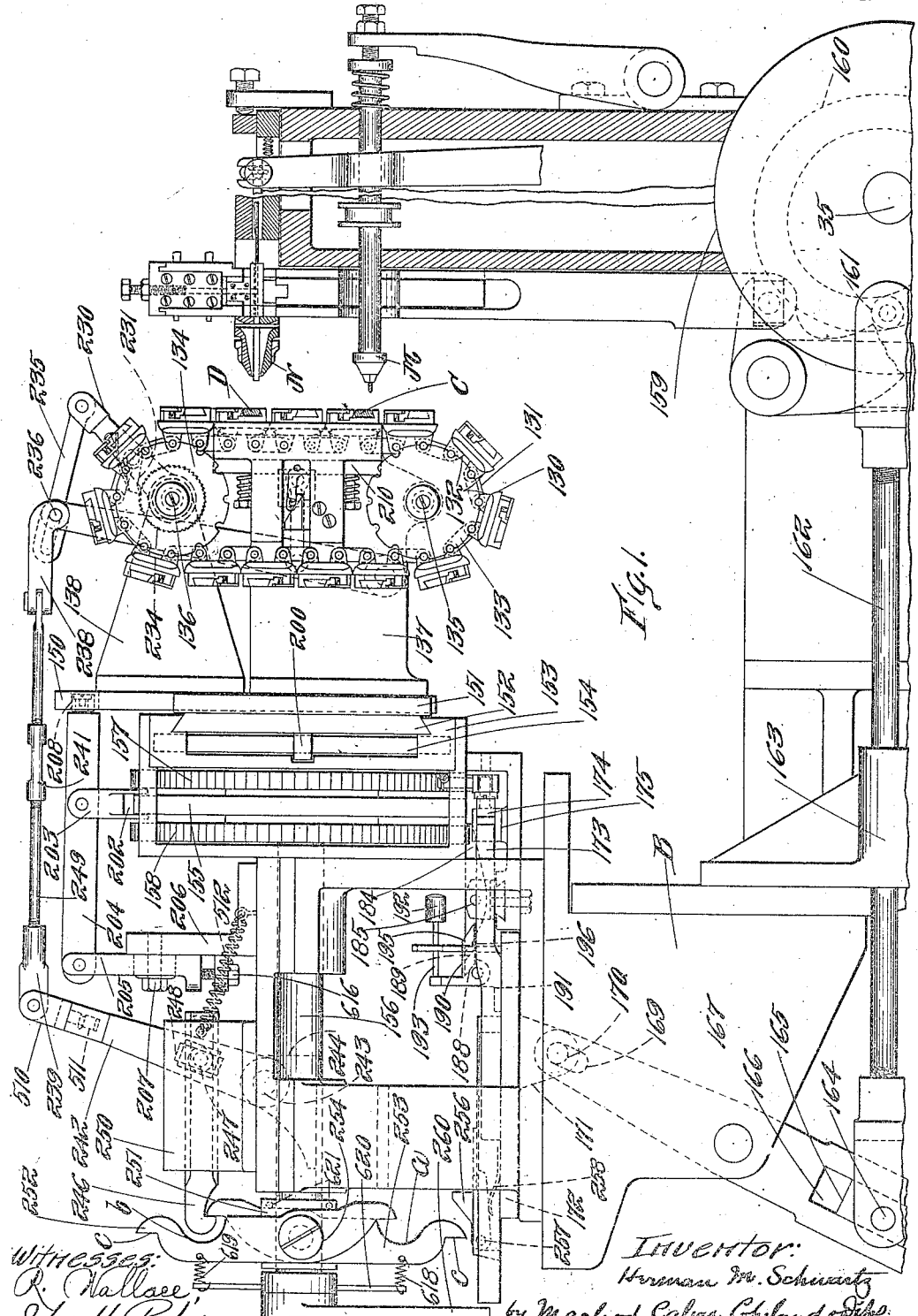

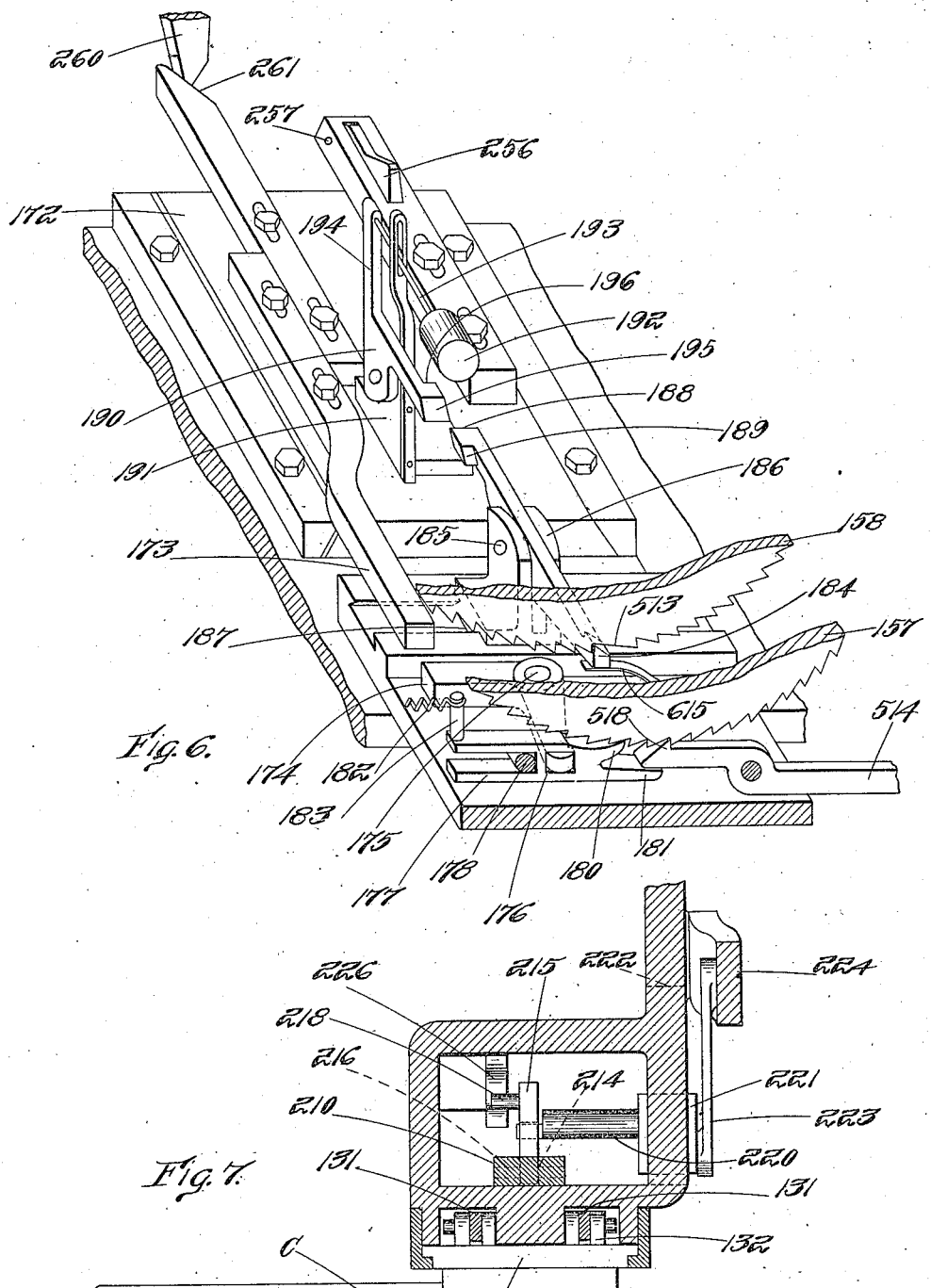

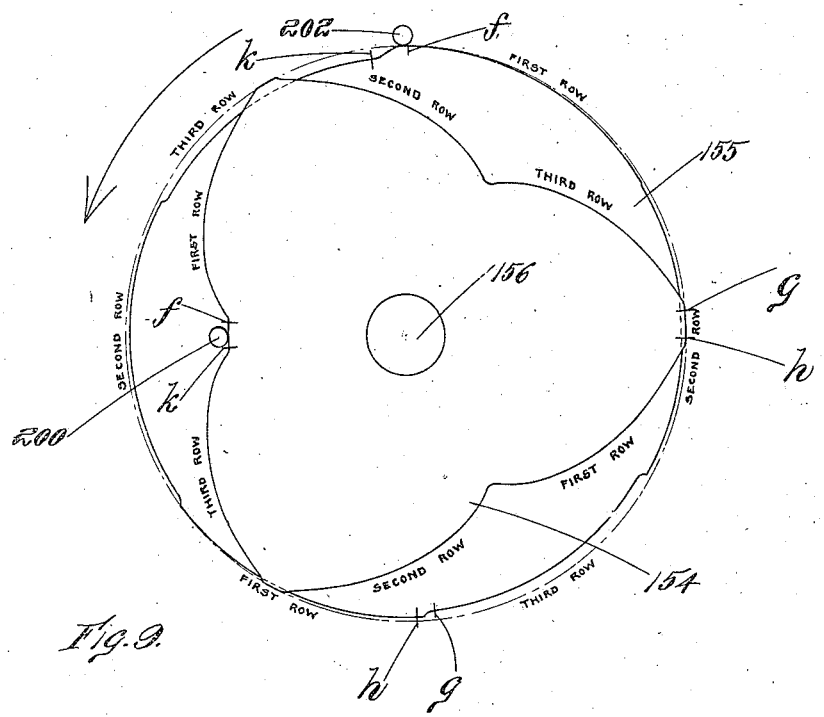
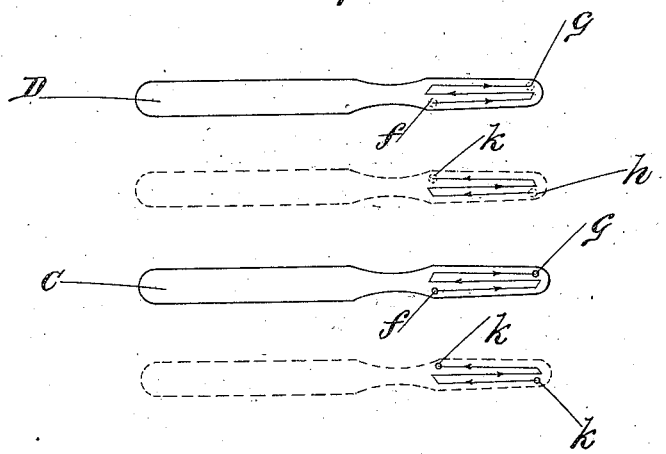

UNITED STATES PATENT OFFICE.

HERMAN M. SCHWARTZ, OF NORTHAMPTON, MASSACHUSETTS, ASSIGNOR TO FANNIE B. LOOK, OF NORTHAMPTON, MASSACHUSETTS, GEORGE H. BURR, OF NEW YORK, N. Y., AND ELDON MACLEOD, OF WESTWOOD, MASSACHUSETTS, TRUSTEES.

BRUSH-MAKING MACHINE.

1,125,189.   Specification of Letters Patent.   Patented Jan. 19, 1915.

Original application filed January 9, 1912, Serial No. 670,177. Divided and this application filed November 4, 1912. Serial No. 729,303.

*To all whom it may concern:*

Be it known that I, HERMAN M. SCHWARTZ, a citizen of the United States, residing at Northampton, county of Hampshire, State of Massachusetts, have invented a certain new and useful Improvement in Brush-Making Machines, of which the following is a specification, reference being had therein to the accompanying drawings.

This is a division of my previous application for brush machines filed January 9, 1912, Ser. No. 670,177.

The machine embodying the invention described herein belongs to the general type of brush machines known as Gane machines, and the invention has to do particularly with mechanism for automatically positioning the brush backs during the operation of drilling and plugging and for presenting to the drill and plugger new brush backs when the previous ones have been completed.

Heretofore, so far as known to me, machines of this character have been constructed to produce only brushes having an even number of parallel rows of tufts as for instance a four-row brush.

The machine embodying my present invention is especially constructed for use in the manufacture of brushes which have an uneven number of rows, said rows not being parallel with each other. The machine shown in the accompanying drawings is intended for use in the manufacture of a three-row brush, the rows of which converge toward the end or tip of the brush. As will be explained later, the complete cycle of operations of this machine includes the drilling and tufting of two three-row brushes of the kind described, the parts coming back to their original starting position after the completion of the second brush.

It will be understood, of course, that the drilling and tufting of two brush blanks is proceeding simultaneously.

Throughout the following specification I have referred to the piece of bone or celluloid which is drilled and filled with bristles to form tufts as the brush blank, although it is often referred to in practice as the handle.

The general mode of operation of the machine may, for convenience of understanding the following description of the machine be outlined as follows: After the tuft of bristles has been set in a drilled brush blank and the corresponding hole drilled in another brush blank, both the said brush blanks being held by the automatic positioning mechanism, the carrier, which is stationary so far as movement toward or away from the drill and plugger is concerned, is then moved horizontally and vertically to bring the brush blanks in position to have the next hole in the undrilled brush blank drilled, and the corresponding hole in the drilled brush blank filled. This operation continues until the two blanks are drilled and filled; during all this time while the carrier is at rest it is rigidly locked in position. The carrier is then unlocked; shifted to bring two more brush blanks in position and then locked in place again when the operation is repeated.

The invention will be fully understood from the following description taken in connection with the accompanying drawings, and the novel features will be pointed out and clearly defined in the claims at the close of the specification.

Figure 2:
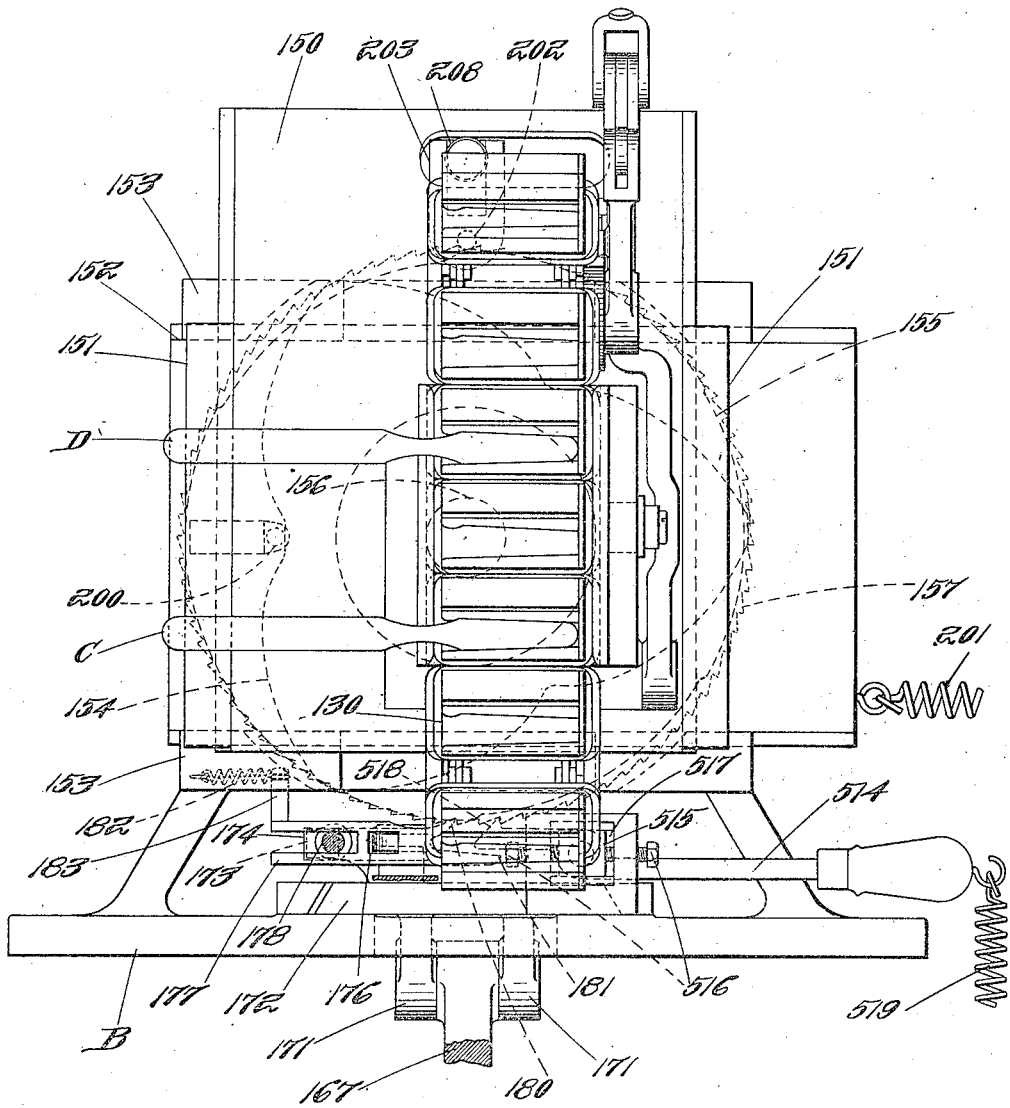
Figure 3:
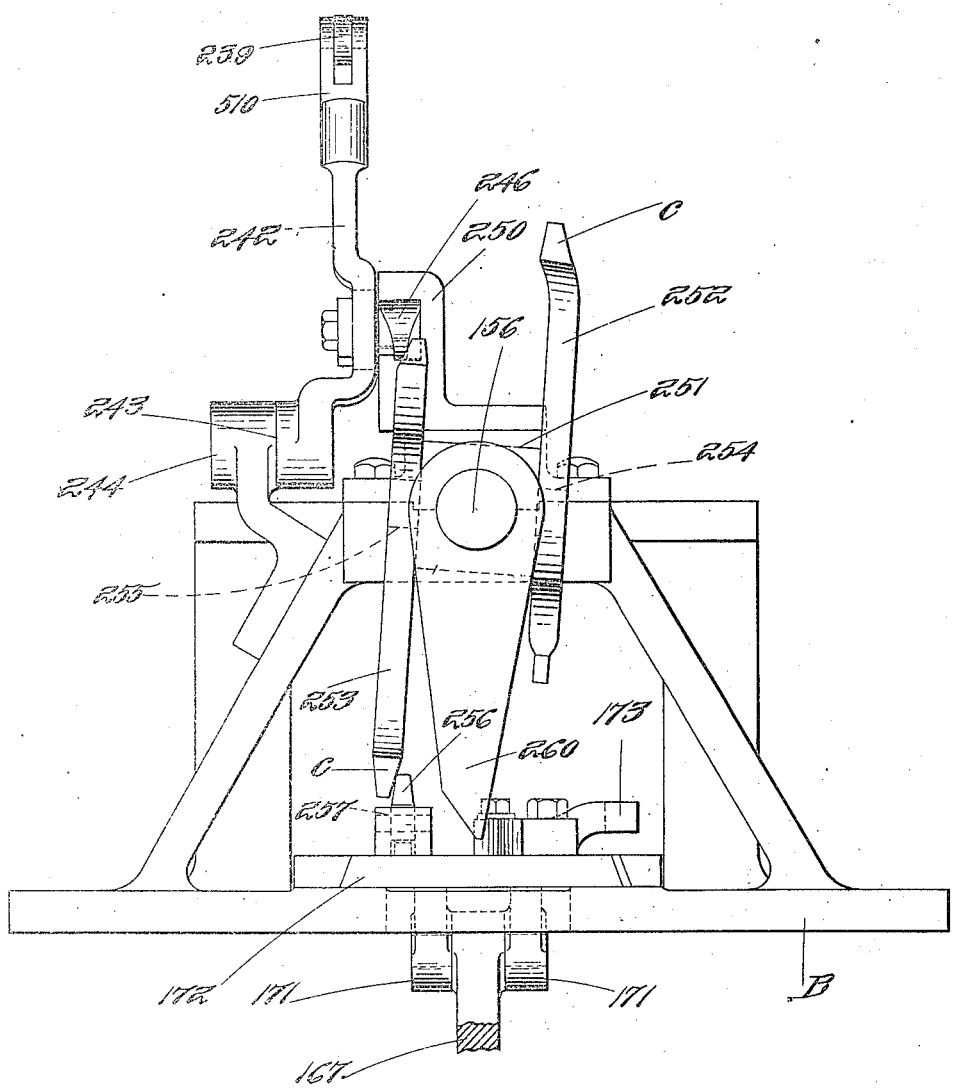
Figures 4, 5:
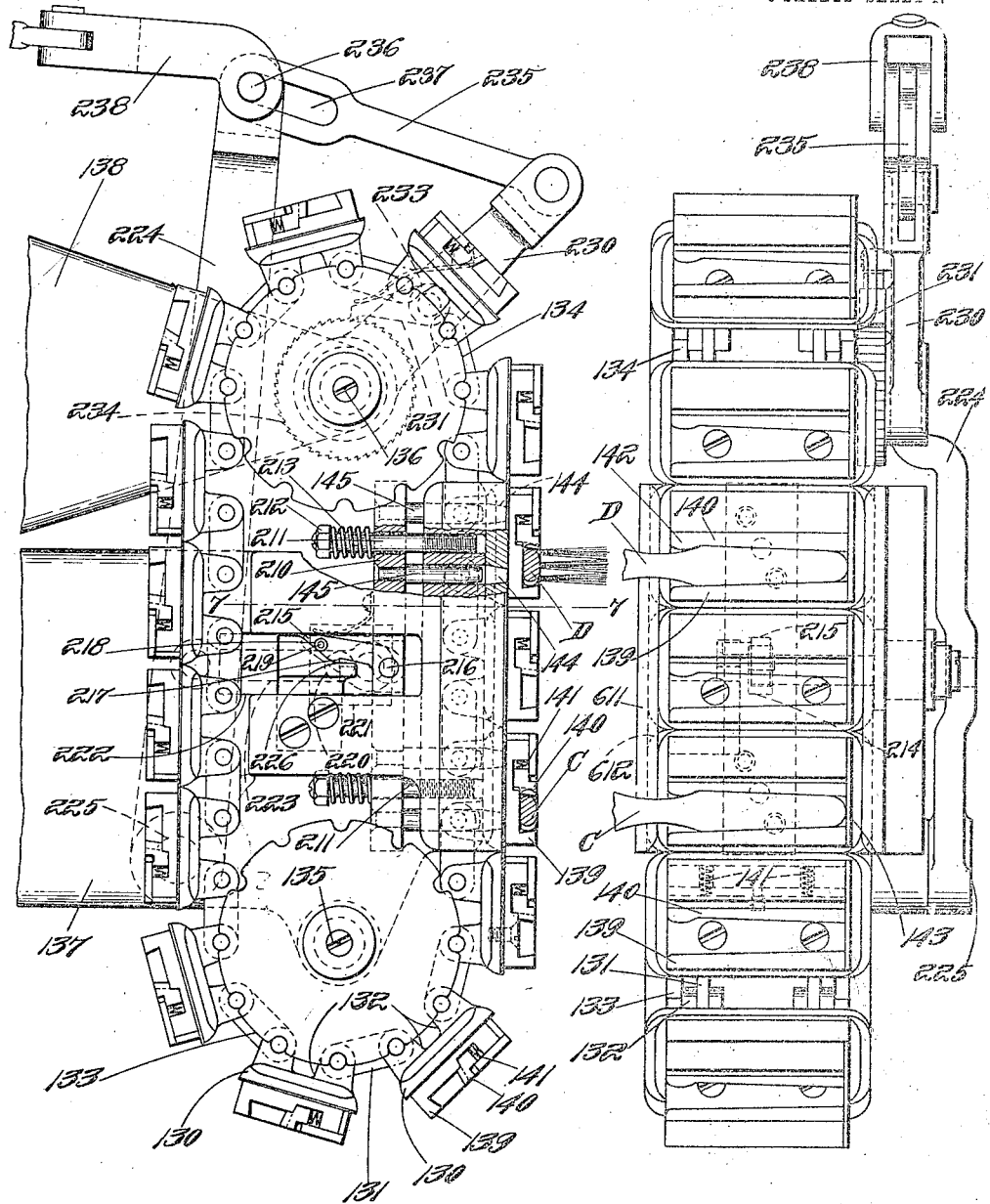

In the drawings, Figure 1 is a side elevation of a machine embodying my invention, the front of the machine being at the right of this view. Fig. 2 is an elevation of the automatic positioning mechanism looking toward the left in Fig. 1. Fig. 3 is a rear elevation of the machine. Fig. 4 is a side elevation of the brush holder and related mechanism on a somewhat enlarged scale. Fig. 5 is a front elevation of the parts shown in Fig. 4 and on the same scale. Fig. 6 is a view in perspective of the parts which actuate the feed wheel. Fig. 7 is a section on line 7—7 Fig. 4, showing the parts locked. Fig. 8 is a diagrammatic view illustrating the path of movement of the drill and tufter relatively to the brush blanks, and corresponding with one cycle of movement of the machine. Fig. 9 is a diagram of the horizontal and vertical cams.

Referring to the drawings, and particularly to Fig. 1, the drill is marked M and the tufter or plugger is marked N. In the present machine, the face of the brush blanks to be drilled and tufted remains in the same vertical plane throughout the operation; in other words, the plugger and drill advance to meet the brush blanks and the brush blank is stationery, instead of the brush blank advancing to a stationary drill and plugger. The arrangement has the great advantage that the carrier for the brush backs may be made much more rigid and consequently the work performed by the machine is more accurate than is possible where the carrier has a forward and backward movement.

The carrier in the present machine is made in the form of an endless chain to which are secured a number of brush holders. In the drawing, the carrier contains fifteen brush holders. While the drilling of one brush blank is taking place, the plunger is setting the knots in another brush blank. After each hole has been drilled, the brush blank is moved sidewise and raised or lowered if required so that it is in position for the next hole to be drilled. At the same time, corresponding holes in the other blanks are being tufted. After all of the holes in the brush blank have been drilled or tufted, the carrier which has previously been locked in place, is unlocked and is revolved a sufficient distance to bring the next brush blank into position after which it is again locked in place. The holder, in which is located the brush blank which is being tufted, is separated from the holder containing the brush blank which is being drilled by another holder. As will be later explained, the cams of the positioning mechanism complete two blanks for each revolution of the cams. By arranging the holders on the carrier as described, the same portion of the cam is positioning the carrier during the tufting which positioned the carrier when this brush blank was drilled. In this way, any deviation between the two parts of the cams causes no wrong positioning of the brush blank when it is being tufted.

The positioning mechanism is composed of three groups of elements, one of which moves the carrier horizontally, another of which moves the carrier vertically, the third of which unlocks the carrier and revolves it after the brush blank has been drilled and a corresponding blank has been tufted.

Although the cycle of rotation of the machine covers the making of two three-row brushes, the carrier is unlocked and moved after each brush is completed, that is, twice for each cycle of the machine.

The carrier and positioning mechanism therefore are supported rigidly upon a frame B made up of convenient pieces suitably secured together. This frame is preferably heavy and strong to insure rigidity of the carrier. The carrier (see Figs. 4 and 5) is constructed in the form of an endless chain consisting of fifteen brush blank holders 130 secured together by links 131 pivoted to lugs 132 on the back of the blank holders. The endless chain formed by the blank holders 130 and links 131 revolves upon two sprocket wheels 133 and 134 carried on axles 135 and 136.

The brush blanks C and D are held in place in the holders 130 between a fixed abutment 139 and a movable abutment 140 which is yieldingly pressed against the side of the brush blank by the springs 141. The movable abutment 140 is provided with a shoulder 142 adapted to engage the side of the neck of the brush blank, as is plainly seen in Fig. 5. The tip end of the brush blank contacts with a wall 143.

The brush blank is inserted in the holder by being pushed in from the left hand side, as seen in Fig. 5, until the tip of the brush blank contacts with the wall 143. The cavity in which the brush blank is received is slightly narrower at the front than at the rear, i. e., the walls are undercut, although the brush blank is not of this shape so that there is a tendency for the brush blank to be crowded back against the rear wall of the cavity and the brush blank is always accurately positioned in the blank holder and held there rigidly.

Two brackets 137 and 138 support the carrier. The front portion of the lower bracket 137 is formed into a grooved guide or shoe 611, upon which the holders 130 are guided when the carrier is shifted. The guide 611 also forms the support for the holders during the drilling and tufting, and the carrier is locked to it during all this time. The holders 130 have projections 612 on their edge which slide in grooves in the said guide 611.

The two brackets 137 and 138 which support the carrier are mounted upon a slide 150 which is known as the vertical slide, which is movable in ways 151. These ways are themselves secured to the horizontal slide 152, which is carried in ways 153 in the frame B of the machine. The two slides 150 and 152 are moved by cams 155 and 154 which are respectively the vertical and horizontal cams, said cams being located on a cam shaft 156 mounted on the frame B of the machine. The cam shaft 156 is provided with two toothed wheels, 157, which is the feed wheel by means of which the cam shaft and connected parts are moved, and 158 which is the locking wheel and serves to keep the cam shaft from moving more than a single notch at a time.

The cam shaft 156 is caused to move in the following manner: On the main shaft 35 (see Fig. 1) which actuates the body of the machine is located a cam 159, having therein a cam groove 160 in which travels a cam roll 161 on the end of a connecting rod 162 so that a properly timed reciprocation is imparted to the connecting rod by the cam. The connecting rod is guided in a bearing 163 in the frame of the machine and is forked at its rear end for connection by means of a pin 164 to a sliding block 165 which is guided in a slot 166 in a rocking lever 167 which is also slotted as shown at 169 to receive the pin 170 which is held in two lugs 171 (one only being visible in Fig. 1) on the bottom of a slide 172 which is known as the bunter slide. The bunter slide is suitably guided in the frame B of the machine, and is caused to reciprocate toward and away from the body of the machine by the parts just described. A bunter 173 is secured to the top of the bunter slide and its forward end is in line with one arm of a bell crank 174 (see Fig. 6) pivoted at 175 to the frame B. The other end of the bell crank 174 projects into a slot 176 in the feed dog 177 (see also Fig. 2). The rear end or tail of the feed dog 177 is forked to receive a stud 178 on an upwardly projecting edge of the frame B. The other end of the feed dog is formed into a point 180 for engagement with the teeth of the feed wheel 157, and also has a forward projection 181 for a purpose which will be later described. A spring 182 secured to a post 183 on the tail of the feed dog 177 draws back the feed dog toward the left as seen in Fig. 2 after each reciprocation of the feed dog.

One revolution of the main shaft 35 occurs for each hole drilled and each knot of bristles set, and therefore, the bunter slide which is operated from this cam shaft is caused to strike the tail of the bell crank 174 and move the feed dog 177 into engagement with the feed wheel 157 once for each revolution of the main shaft. Thus the feed wheel is moved one notch for each hole drilled and tuft set. Backward rotation of the cam shaft 156 on which the feed wheel 157 is located is prevented by means of a locking wheel 158 and locking pawl 184 mounted on a pin 185 secured to a lug 186 on a little slide 187 which can be moved in ways in the frame of the machine for purposes of adjustment. The tail of the locking pawl 184 is bent at right angles to its general direction and is provided with two inclined surfaces 188 and 189. There is a dog 190 pivoted on a lug 191 on the upper surface of the bunter slide 172 and this dog 190 is also provided with two inclined surfaces 195 and 196 on a portion which is bent toward the tail of the locking pawl 184. The dog 190 is held yieldingly in the position shown in Fig. 1 and Fig. 6 by means of a weight 192 on an arm 193 fastened to a post 194 on the dog. When the bunter 173 moves toward the bell crank 174, the inclined face 195 on the dog 190 contacts with the correspondingly inclined face 188 on the tail of the locking pawl 184, lifting it up so that the point of the locking pawl is out of engagement with the locking wheel 158 and the cam shaft 156 is free to move just at the instant the bunter 173 contacts with the bell crank 174 to move the feed dog 177 and turn the feed wheel 157. On the reverse movement of the bunter, the other inclined surface 196 on the dog 190 contacts with the other inclined surface 189 on the tail of the locking pawl and the dog 190 rides up over the tail of the locking pawl lifting the weight 192, and then drops down into its normal position. This backward movement is simply for the purpose of getting the parts into normal position again. A spring 615 under the front end of the locking pawl throws its end up into engagement with the locking wheel as soon as the wheel has been moved.

The foregoing description explains the manner in which the cam shaft 156 upon which is located the vertical cam 155 and the horizontal cam 154 are given their step-by-step rotation in proper time with the movements of the drill and tufter. The horizontal slide 152 is moved in one direction by the horizontal cam 154 by means of a cam roll 200 (see Fig. 2) which is secured to the back side of the horizontal slide 152 and the said slide 152 is moved in the other direction by the spring 201.

The vertical cam 155 gives to the vertical slide 150 its vertical movement through a cam roll 202 secured to a fork 203 (see Fig. 1) which is itself pivoted near the middle of a lever 204. The rear end of the lever 204 is held by means of a vertically adjustable post 205, itself secured to a bracket 206 on the frame of the machine. The adjustment of the post 205 is made by means of an adjusting screw 616 and a set screw 207. The front end of the lever 204 is provided with a hardened roller 208 which forms the point of engagement with the upper end of the slide 150. As the vertical cam 155 revolves, it raises or lowers the lever 204 and thus moves the vertical slide and attached parts in the vertical plane for a predetermined amount.

As previously stated, after the completion of the work of drilling and tufting each brush, it is necessary to unlock the carrier and shift it a sufficient distance so that the next brush blanks will be in proper position to be tufted and drilled, respectively. Each blank holder 130 has drilled in its back side two tapered holes 144, in which are received tapered locking pins 145 which lock rigidly the blank holder and carrier to the guide 611 and hold it so during the drilling and tufting. These pins 145 are secured to a plate 210, which for convenience is called the locking pin plate. This plate is guided upon two bolts 211 which are secured in the rear face of the guide 611 upon which the carrier is supported. Nuts 212 are placed upon the ends of these bolts and a spring 213 is interposed between the nut 212 and the locking pin plate 210. These springs push the locking pin plate 210 and the locking pins 145 forward into the tapered holes in the backs of the blank holders 130. The locking pin plate 210 is slotted as shown at 214, Figs. 5 and 7, and a hook 215 is attached to the locking plate by means of a pin 216. The lower surface of the hook 215 is notched, as shown at 217 and a small roller 218 is secured to the hook by a stud 219. Under the hook 215, is located a pin 220 the end of which is formed into the shape of a quarter segment (see Fig. 7). This pin is carried on a small cross-head 221 arranged to slide in a slot 222 in a portion of the bracket 137. To this cross-head is pivotally secured one end of a link 223, the other end of which is secured to a lever 224. The lower end of this lever is pivoted at 225 to the bracket 137. The upper end of the lever 224 is attached to mechanism which causes it to be swung about the pivot 225 whenever it is necessary to unlock the blank holders. The small roller 218 on the point of the hook 215 is located so that it will contact with a cam 226 when the locking pin plate has been moved out to a certain point, and as the cam roll 218 rides up on the cam 226 it finally lifts up the hook 215 until the hook is disengaged from the end of the pin 220 on the end of which is formed the quarter segment previously referred to. As soon as the hook is disengaged from the said pin, the springs 213 force the locking pin plate and locking pins back against the back sides of the blank holders, and as soon as the holes 144 in the blank holders come opposite the locking pins 145, the pins snap into the holes and lock the blank holders in place. This mechanism is such that the locking pins are drawn completely out of their holes a sufficiently long time before the hook 215 is disengaged from the pin 220 to permit the blank holders to be moved far enough so that when the locking pins snap back they cannot engage the holes from which they have been withdrawn, but will engage the next holes when the carrier is moved a sufficient distance.

The shifting of the carrier is produced by an arm 230 provided with a pawl 231 held in engagement by a spring 233 with a ratchet wheel 234 fast to the upper sprocket wheel 134. When the arm 230 is moved to the left, as shown at Fig. 4, the ratchet wheel 234, the sprocket wheel 134, and the carrier will be moved with it a distance depending upon the distance which the arm 230 is moved. A slotted link 235 is connected at one end to the arm 230 and at the other end engages a pin 236 on the upper end of the locking pin lever 224. The slot 237 in the link 235 is so proportioned that the locking pin lever 224 is moved a sufficient distance to unlock the blank holders before the pin 236 comes to the end of the slot 237. In Fig. 6 the parts are shown in the position they occupy after the parts have been unlocked and before the shifting of the carrier has begun. Thereafter the further movement begins the shifting of the blank holders and finally disengages the locking pin hook 215 to permit the locking pins to snap back and engage the holes in the blank holders when the blank holders have been moved into place.

The locking pin lever 224 is moved by a connecting rod 249 provided with two end members 238 and 239 and a turn buckle 241 for adjusting its length. The end member 239 is pivotally secured to a fork 510 on the upper end of a lever 242 pivoted at 243 to a lug 244 on the frame B of the machine. The fork 510 is arranged to swing a little on a stud 511 so that the parts will not bind as the carrier is moved sidewise by the horizontal cam. The lever 242 is itself moved by a hook 246 secured to the lever 242 by a pin 247 sliding in a slot 248 in the lever 242. The hook 246 is guided in suitable ways in a portion 250 of the frame B of the machine. The cam shaft 156 on which the horizontal and vertical cams are located extends rearwardly through the machine and has secured to its rear end a block 251. On this block 251 are two levers 252 and 253, pivoted at 254 and 255 respectively. These levers rotate with the cam shaft 156 and after every 180 degrees of rotation the end of one of the levers 252 and 253 comes under the hook 246, as seen in Fig. 1. Both of these levers 252 and 253 are cut away as shown at a b, to permit this arm of the lever to rotate without striking the projecting end of the hook 246. On the long arms of the levers 252, 253 are formed flat spaces c c suitable for engagement with the corresponding flat space on the dog 256. This dog is pivoted at 257 to the rear end of the bunter slide 172, which reciprocates every time a hole is drilled and a tuft of bristles set. This pawl 256 is held up into the position shown in Fig. 1 by means of a flat spring 258. When one of the levers 252 and 253 has revolved to such a position that it is in the path of the dog 256, the next rearward movement of the bunter slide 172 carries the dog 256 under the lever 252 or 253, as the case may be, the dog 256 being depressed against the action of the spring 258. At the end of the stroke of the bunter slide the dog 256 snaps up and on the forward movement of the bunter slide engages the flat surface c and swings the lever about its pivot 254 or 255. At this time the upper end of the lever is in engagement with the hook 246, the forward movement of the bunter slide carries the lower end of the lever 252 or 253 toward the right and pulls the locking pin lever 224 and the carrier moving arm 230 over to the left to unlock the blank holders and rotate the carrier. At the end of the forward movement of the bunter slide at which time the feed wheel and cam shaft are rotated one notch the lever 252 or 253 as the case may be, being rotated by the cam shaft is disengaged from the dog 256, while the bunter slide is still in its forward position. As soon as the lever 252, or 253, is released, the spring 512 restores the parts to normal position which is that shown in Fig. 1. The levers 252 or 253 are restored to the position shown in Fig. 1 by springs 618 and 619, one end of which is fastened to a stud 620 on the cam shaft. The lever then rests against a pin 621 so that it is ready to be engaged on the next rotation of the cam shaft.

For a reason later to be explained, it is necessary to turn the cam shaft 156 one extra notch of the feed wheel 157 at the end of each cycle of movement of the machine. This is accomplished by means of a tail piece 260 secured at the rear end of the cam shaft 156. Once in each revolution this piece 260 comes to a position in the way of an inclined surface 261 on the rear end of the bunter slide 172. When the bunter slide comes back at the end of the stroke, the cam surface 261 strikes the tail piece and pushes it to one side to the position shown in Fig. 3, causing the cam shaft 156 to rotate a distance of one notch of the feed wheel. To permit this rotation the locking wheel 158 has one tooth removed as seen at 513, in Fig. 6, so that at this time the locking pawl 184 does not interfere with the movement of the feed wheel and connected parts.

As it is necessary to move the cam shaft by hand sometimes there is provided a hand lever 514 (see Figs. 2 and 6) pivoted to an adjustable block 515 movable by screws 516 in a slot 517 in the frame of the machine. The other end of the lever 514 is provided with a hook shaped pawl 518 which engages the feed wheel 157 and prevents its rotating backward after it has been moved forward by the feed dog 177. The projection 181 on the feed dog 177 extends under the hook shaped pawl 518 which forms a part of the lever 514 so that when the lever 514 is lifting up by hand the feed dog 177 and the pawl 518 are both disengaged from the feed wheel and the feed wheel is then free to be moved by hand. The spring 519 keeps the hook pawl 518 normally in engagement with the feed wheel.

The operation of the machine is in general as follows: The operator inserts an undrilled brush blank C in the proper blank holder 130 and a drilled blank D in the blank holder next but one above. In practice, and after the machine has been started, there are blanks in all the holders 130, and the workman removes the tufted brush blank from one of the top holders and inserts the undrilled blanks at this point. He then presses the treadle, and the drill begins at point f in Fig. 8 to drill the holes. At the same time, the tufter begins to fill the holes starting at the corresponding point in the already drilled brush blank. At each revolution of the main shaft 35 the drill bores a hole, and the plugger sets the knot of bristles in the hole. After the drill has been drawn out of the drilled hole, the feed wheel 157 is moved one notch by means of the bunter and intermediate parts. The movement of the feed wheel moves the carrier to the left (see Fig. 2) the distance of one notch and the vertical cam lowers the carrier a slight amount because as will be seen from Fig. 8 the rows of bristles in the finished brush are not parallel but converge toward the tip of the brush. This general movement of the parts continues until the end of the first row of brush No. 1 is reached. After the last hole of this row has been drilled, the next movement of the feed wheel lowers the carrier to position the brush blank to begin the second row of holes. As the second row of holes is horizontal, that is, follows the median line of the brush, the brush is not moved vertically while the second row is being drilled and tufted. At the end of the second row, the carrier is lowered by the vertical cam, and the drilling of the third row begins. While this row is being drilled and tufted, the carrier is raised slightly after each hole has been drilled. The last hole in the third row is marked g in Fig. 8. After this hole has been drilled and tufted, one of the levers 252 and 253 has come in contact with the dog 256 on the rear end of the bunter slide which results in unlocking the carrier and shifting it to bring the next pair of blanks in position to be operated upon. The same forward movement of the bunter slide which unlocks the carrier and shifts it, moves the feed wheel one notch and the corresponding movement of the vertical cam raises the brush blank so that it is in position to have the hole h in brush blank No. 2 drilled and the corresponding hole in the brush blank which is before the plugger tufted. The drilling and tufting of this pair of brush blanks is the same as that previously described, except that the path followed by the drill and plugger is different from that followed by the drill and tufter during the drilling and filling of the first pair of brush blanks. The paths of movement of the two brush blanks will readily be seen from an examination of Fig. 8. The starting point for the first and second brushes being indicated respectively at f and h and the finishing point being indicated by g and k respectively. It will be seen that the next point after the hole marked $k$ in Fig. 8 will be the hole $f$ which is the starting point of the first brush and that there is a considerable vertical distance between these two holes. The carrier is lifted through this vertical distance by means of the vertical cam but as this distance is so large that it would make the cam too steep if the movement were made during a single notch of the feed wheel, an additional notch is provided in the feed wheel, as has been previously described. The feed wheel therefore has eighty-one notches, forty for the forty tufts of bristles in the first brush, forty for the second brush and one additional hole at the end of each cycle of revolution to assist in setting the machine back to its starting point. The feed wheel is moved this additional notch by the tail piece 260, as previously described. The machine is then ready to begin a second cycle of movements.

In Fig. 9 there is shown a diagram of the vertical and horizontal cams and there has been indicated on the cams the various points of the cams which are in contact with the cam roll at the time when the holes at the beginning and end of each brush are being drilled. For convenience the same reference characters have been applied to this figure as are applied to Fig. 8 to indicate corresponding positions on the cam. It will be noticed that the starting points on the two cams are at a distance of about ninety degrees from each other owing to the fact that the cam roll for the vertical cam is above the cam while the cam roll for the horizontal cam is at the left hand side of the cam.

What I claim is;

1. In a machine of the character described, the combination of a tool to operate upon a brush blank, a movable carrier for a plurality of brush blanks, said carrier being an endless chain, and positioning mechanism moving the carrier in two directions in a plane at right angles to the said tool.

2. In a machine of the character described, the combination of a tool to operate upon a brush blank, said tool being movable longitudinally, a movable carrier for a plurality of brush blanks, said carrier being an endless chain and remaining in a plane at right angles to the said tool during a cycle of movement, and positioning mechanism moving the carrier in two directions in said plane.

3. The improved holder for the blank to be operated upon in a brush making machine, comprising a fixed abutment parallel with the side of the brush blank, a second fixed abutment at substantially right angles to said first mentioned fixed abutment, and a yielding abutment substantially parallel with said first mentioned fixed abutment and having thereon a convex projection adapted to contact with the corresponding concavity forming the neck of the brush blank, said yielding abutment and said fixed abutment being flared to permit the widest portion of the brush blank to pass the said convex projection.

4. The improved holder for the blank to be operated upon in a brush making machine, comprising a fixed abutment and a yielding abutment shaped to form a space between them which is narrower on the front than on the back so that the brush blank is crowded back toward the back of the holder by the said yielding abutment.

5. In a machine of the character described, the combination of a tool to operate upon the brush blank, a carrier, a shaft, two cams thereon moving the carrier in two directions in a plane at right angles to the tool, said cams by a single rotation of the cam shaft controlling the positioning movements of the carrier during the operation on two successive blanks and shifting mechanism shifting the carrier to present the next blank to the tool, said shifting mechanism acting twice during each revolution of the cam shaft.

6. In a machine of the character described, the combination with a tool to operate upon a brush blank, of a carrier composed of a plurality of holders forming an endless chain, a guide over which the holders travel, said guide and the holders thereon being movable in two directions in a plane at right angles to the said tool to position the brush holders during the drilling and filling of one pair of brush blanks, and shifting mechanism moving the brush holders on the guide after the completion of the work on one pair of blanks.

7. In a machine of the character described, the combination of a tool to operate upon the brush blank, a carrier, a shaft, two cams thereon moving the carrier in two directions in a plane at right angles to the tool, said cams by a single rotation of the cam shaft controlling the positioning movements of the carrier during the operation on two successive blanks, locking mechanism locking the holders to the guide and shifting mechanism shifting the carrier to present the next blank to the tool, said shifting mechanism acting twice during each revolution of the cam shaft.

8. In a machine of the character described, the combination with a tool to operate upon a brush blank, of a carrier composed of holders forming an endless chain, a guide over which the holders travel, said guide and the holders thereon being movable in two directions in a plane at right angles to the said tool to position the brush holders during the operation on one pair of brush blanks, locking mechanism locking the holders to the guide, and shifting mechanism moving the brush holders on the guide after the completion of the work on one pair of blanks.

9. In a machine of the character described, the combination of a tool to operate upon the brush blank, a carrier, a guide over which the carrier travels, a shaft, two cams thereon moving the carrier in two directions in a plane at right angles to the tool, said cams by a single rotation of the cam shaft controlling the positioning movements of the carrier during the operation on two successive blanks, locking mechanism locking the carriers to the guide, actuating mechanism therefor, and shifting mechanism shifting the carrier to present the next blank to the tool, said shifting mechanism acting twice during each revolution of the cam shaft, said locking actuating mechanism operating to unlock the carrier before the shifting mechanism moves it on the guide.

10. In a machine of the character described, the combination with a tool to operate upon a brush blank, of a carrier composed of holders forming an endless chain, a guide over which the holders travel, said guide and the holders thereon being movable in two directions in a plane at right angles to the said tool to position the brush holders during the operation on one pair of brush blanks, locking mechanism locking the holders to the guide, actuating mechanism therefor, and shifting mechanism moving the brush holders on the guide after the completion of the work on one pair of blanks, said locking actuating mechanism operating to unlock the holders before the shifting mechanism moves them on the guide.

11. In a machine of the character described, the combination with a tool to operate upon a brush blank, a work carrier composed of holders forming an endless chain, and a guide over which the holders are movable, of locking mechanism comprising tapered pins passing through the said guide and into holes in the said holders.

12. In a machine of the character described, the combination with a tool to operate upon a brush blank, a work carrier composed of holders forming an endless chain, and a guide over which the holders are movable, of locking mechanism for the said holders comprising locking pins, a locking pin plate, a hook on the plate, a pin engaging said hook and means for moving the said hook backward to disengage the said pins from the holders.

13. In a machine of the character described, the combination with a tool, a work carrier composed of holders forming an endless chain, and a guide over which the holders are movable, of locking mechanism for the said holders comprising a spring actuated locking pin, a member moving the pin backward out of a hole in the holder and disengaging means to release the said locking pin.

14. In a machine of the character described, the combination with a tool, a work carrier composed of holders forming an endless chain and a guide over which the holders are movable, of locking mechanism for the said holders comprising locking pins, a locking pin plate, guide pins on the said guide extending through the locking pin plate, springs about the said guide pins acting on the plate, means for drawing the said plate backward against the pressure of said springs and disengaging means to release the said locking pin plate.

15. In a machine of the character described, the combination with a tool, a work carrier composed of holders forming an endless chain and a guide over which the holders are movable, of locking mechanism for the said holders comprising locking pins, a locking pin plate, guide pins on the said guide extending through the locking pin plate, springs about the said pins acting on the said plate, a hook on the plate, a pin engaging said hook, means for moving said hook backward to disengage the said pins from the holders and a cam acting against the said hook as the said pin is moved backward, said cam operating to disengage the hook from the pin and release the locking pin plate.

16. In a brush making machine, a tool operating upon a brush blank, brush holders, an endless chain containing said brush holders and positioning mechanism for moving the endless chain in two directions in a plane at right angles with the tool.

17. In a brush making machine, a tool operating upon a brush blank, brush holders, an endless chain containing said brush holders, said endless chain revolving always in the same direction and positioning mechanism for moving the endless chain in two directions in a plane at right angles with the tool.

In testimony whereof I affix my signature, in presence of two witnesses.

HERMAN M. SCHWARTZ.

Witnesses:
WILLIAM A. MACLEOD,
ALICE H. MORRISON.